(12) United States Patent
Ikeuchi et al.

(10) Patent No.: US 7,444,085 B2
(45) Date of Patent: Oct. 28, 2008

(54) DQPSK OPTICAL RECEIVER CIRCUIT

(75) Inventors: Tadashi Ikeuchi, Kawasaki (JP); Naoki Kuwata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 443 days.

(21) Appl. No.: 11/271,771

(22) Filed: Nov. 14, 2005

(65) Prior Publication Data
US 2007/0047972 A1    Mar. 1, 2007

(30) Foreign Application Priority Data
Aug. 25, 2005    (JP)    ............................ 2005-245071

(51) Int. Cl.
H04B 10/06    (2006.01)
H04B 10/00    (2006.01)

(52) U.S. Cl. ................. 398/202; 398/203; 398/154; 398/161

(58) Field of Classification Search ............... 398/154, 398/155, 158, 161, 202, 203, 208
See application file for complete search history.

(56) References Cited

U.S. PATENT DOCUMENTS

| | | | |
|---|---|---|---|
| 5,012,494 A | 4/1991 | Lai et al. | |
| 2004/0081470 A1 | 4/2004 | Griffin | |
| 2006/0056845 A1* | 3/2006 | Parsons et al. | ................. 398/41 |

FOREIGN PATENT DOCUMENTS

| | | |
|---|---|---|
| JP | 8-237228 | 9/1996 |
| JP | A-H11-225050 | 8/1999 |
| JP | A-2002-141785 | 5/2002 |
| JP | 2004-516743 | 3/2004 |
| WO | WO 02/51041 | 6/2002 |

\* cited by examiner

*Primary Examiner*—Dalzid Singh
(74) *Attorney, Agent, or Firm*—Staas & Halsey LLP

(57) ABSTRACT

A DQPSK optical signal is split by the splitter 1 into Data 1 and Data 2 systems. For each system, a phase-modulated optical signal is converted into an intensity modulated electric signal, and clock reproduction and data reproduction are independently carried out for each system. While a phase difference occurs between the data of each system, a clock signal having an intermediate phase of the reproduced clock of each system is generated to latch data of both systems by using the clock signal. This results in the data of both systems having the same phase.

10 Claims, 9 Drawing Sheets

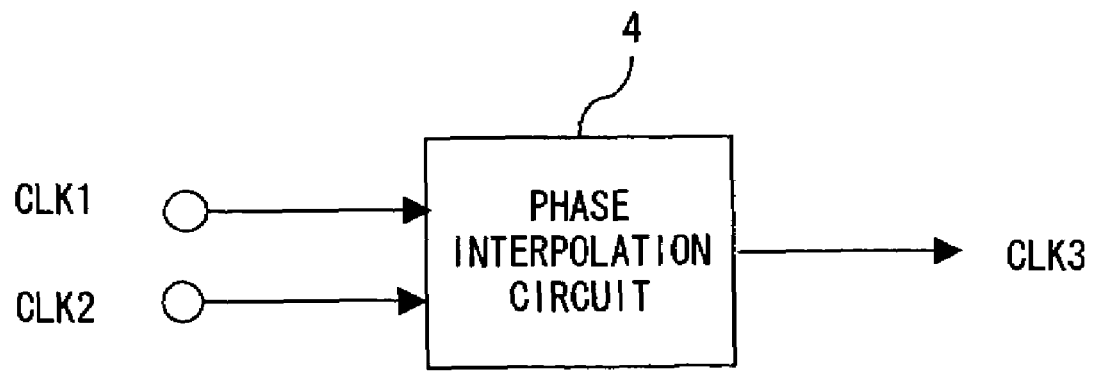
F I G. 5

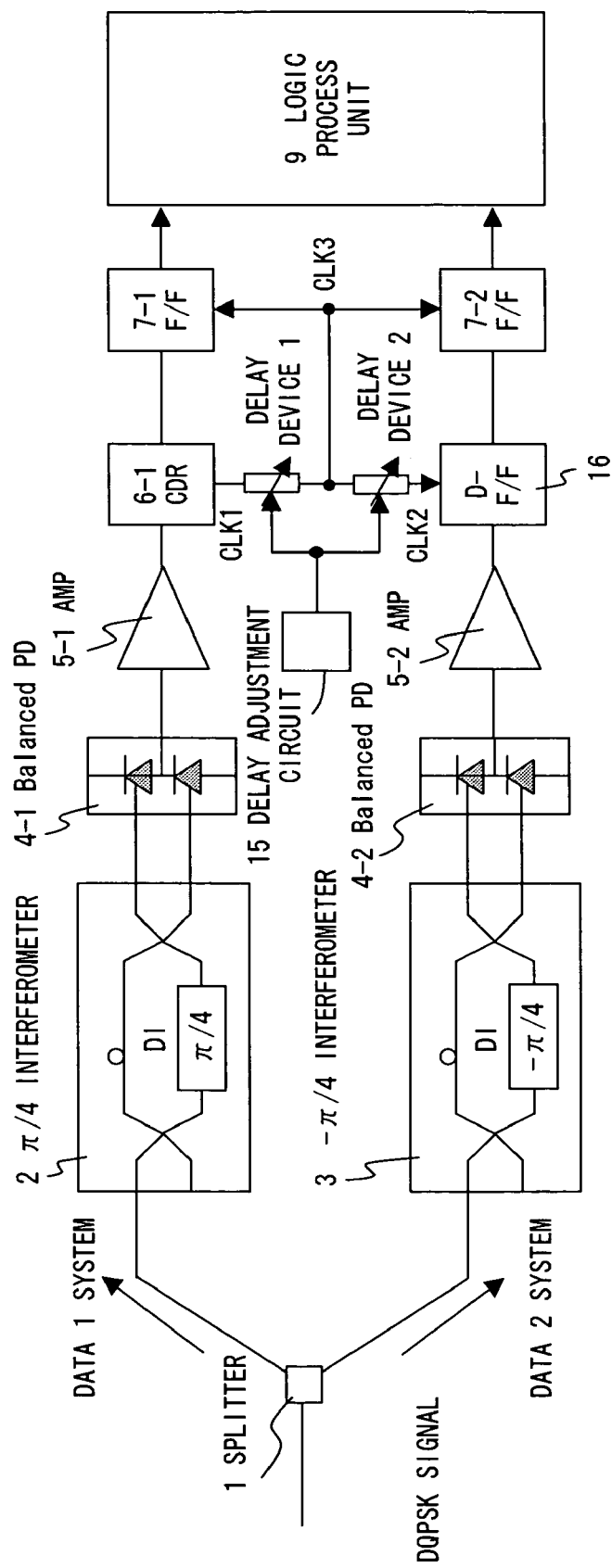
F I G. 6

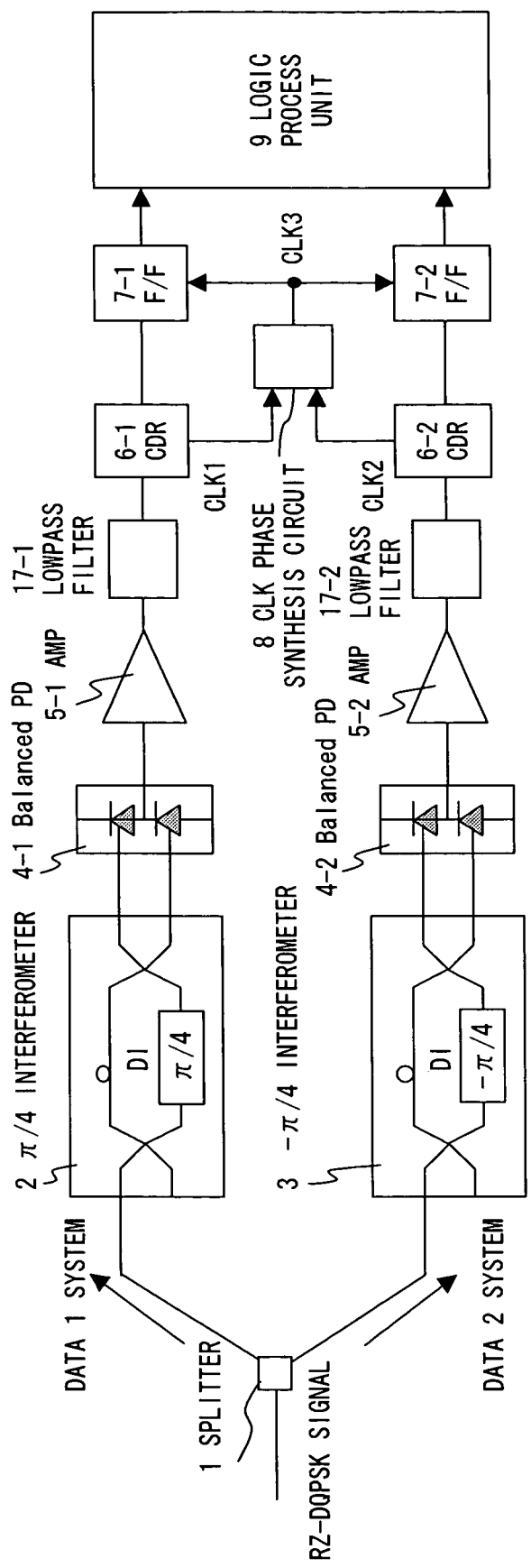
F I G. 7

DQPSK OPTICAL RECEIVER CIRCUIT

BACKGROUND OF THE INVENTION

1. Field of the Invention

The present invention relates mainly to a long distance, ultra high speed optical communication receiver circuit.

2. Description of the Related Art

In recent years, with prevailing network usage there has been increasing demand to increasing the bandwidth of optical communication networks. Since the optical communication network is used for trunk lines, et cetera, it must be capable of long distance communication and of wide band, high speed communication. By conventional methods, however, it has been said that there is only a limited possibility of widening the bandwidth due to the influences of wavelength dispersion, nonlinear effects, et cetera, of optical fiber. In order to solve the problem, an attempt has been proposed for increasing the bandwidth by devising a modulation method for an optical signal, in lieu of a method for suppressing such physical effects directly. In such a proposal, the method for use as a modulation method for the optical signal is the DQPSK (Differential Quadrature Phase Shift Keying) modulation scheme. Note that the present invention, while exemplifying the case of the DQPSK modulation scheme in the following description, is applicable likewise to a case of an M-ary DPSK modulation scheme (where M is 4 or greater).

FIG. 1 shows a configuration of a conventional DQPSK receiver circuit.

This configuration is described in the patent document 1. The DQPSK optical receiver directs the split light to pass through a $\pi/4$ delay interferometer 2 and a $-\pi/4$ delay interferometer 3, respectively, followed by balanced photodiodes 4-1 and 4-2, respectively, to detect "1" and "0" states of the signal (N.B.: this detection is carried out for Data 1 and Data 2 systems respectively). The detected Data 1 and Data 2 are processed by a logic process unit 9 to restore the original signal.

A DQPSK signal uses phases of light, i.e., $\pi/4$, $3\pi/4$, $-\pi/4$ and $-3\pi/4$, as relative phase values for a signal one symbol prior. The $\pi/4$ delay interferometer 2 and $-\pi/4$ delay interferometer 3 bi-split the input optical signal, provide one optical signal a delay of one symbol and provide the other optical signal a phase shift of either $\pi/4$ or $-\pi/4$. By so doing, a balanced photodiode 4-1 of the Data 1 system where the $\pi/4$ delay interferometer 2 is equipped receives the phase shifts of $\pi/4$ and $-3\pi/4$ of the optical signal being converted into intensity changes. Likewise, a balanced photodiode 4-2 of the Data 2 system where the $-\pi/4$ delay interferometer 3 is equipped receives the phase shifts of $-\pi/4$ and $3\pi/4$ of the optical signal, which are the orthogonal components of the optical signal $\pi/4$ and $-3\pi/4$, being converted into intensity changes. The logic process unit 9 applies logic processing, such as sequence changes of the Data 1 and Data 2 systems, et cetera, to the signals converted into electric signals by the balanced photodiodes 4-1 and 4-2, thereby restoring the original signals.

[Patent document 1] United States Patent Application Publication No. 2004/0081470

In the conventional circuit, a D-flip flop is equipped at the input to the logic process unit 9 for signals of Data 1 and Data 2 to identify logic values "1" and "0" of the electric signals of the Data 1 and Data 2 systems. If there is a difference in path lengths from the splitter 1 to the logic process unit 9, et cetera, between the Data 1 and Data 2 systems, the phases of input data to the logic process unit 9 of the Data 1 and Data 2 systems become different, the clock identifier phases of the Data 1 and Data 2 systems become shifted if the identification is carried out by using the same clock, resulting in a degrading of the receiving sensitivity. Especially in the domain of 20 GB/sec and above, where the DQPSK modulation scheme is used, a phase difference on the order of picoseconds cannot be tolerated, thus presenting a significant barrier to accomplishing a DQPSK receiver circuit.

As such, the conventional example is not capable of establishing optimum identifier phases for both the Data 1 and Data 2 systems, and further the logic process unit 9 sometimes misidentifies a signal because the Data phases of the two systems are not synchronized, hence it is not possible to obtain a high performance DQPSK receiver.

SUMMARY OF THE INVENTION

The object of the present invention is to provide a high performance optical receiver which is capable of identifying a signal value accurately in an optical communication system using a DQPSK modulation scheme.

A DQPSK optical receiver circuit according to the present invention comprises a splitter means for splitting a received optical signal; a first photoelectric conversion unit for converting one phase modulated component of one of the optical signals which is split by the splitter means into an intensity modulated electric signal; a second photoelectric conversion unit for converting a phase modulated component which is orthogonal to the one phase modulation component of the other of optical signal split by the splitter means into an intensity modulated electric signal; a first data reproduction unit for reproducing a data signal and a clock signal from an output of the first photoelectric conversion unit; a second data reproduction unit for reproducing a data signal from an output of the second photoelectric conversion unit; and a phase synchronization unit for synchronizing the phases of an output data signal of the first data reproduction unit and an output data signal of the second data reproduction unit.

The present invention makes it possible to provide a high performance optical receiver which is capable of identifying a signal value accurately in an ultra high speed optical communication system using a DQPSK modulation scheme.

BRIEF DESCRIPTION OF THE DRAWINGS

FIG. 5 shows an example configuration of a CLK phase synthesis circuit;

FIG. 6 shows a first modified example of an embodiment according to the present invention;

FIG. 7 shows a second modified example of an embodiment according to the present invention;

DESCRIPTION OF THE PREFERRED EMBODIMENTS

Figure 2:
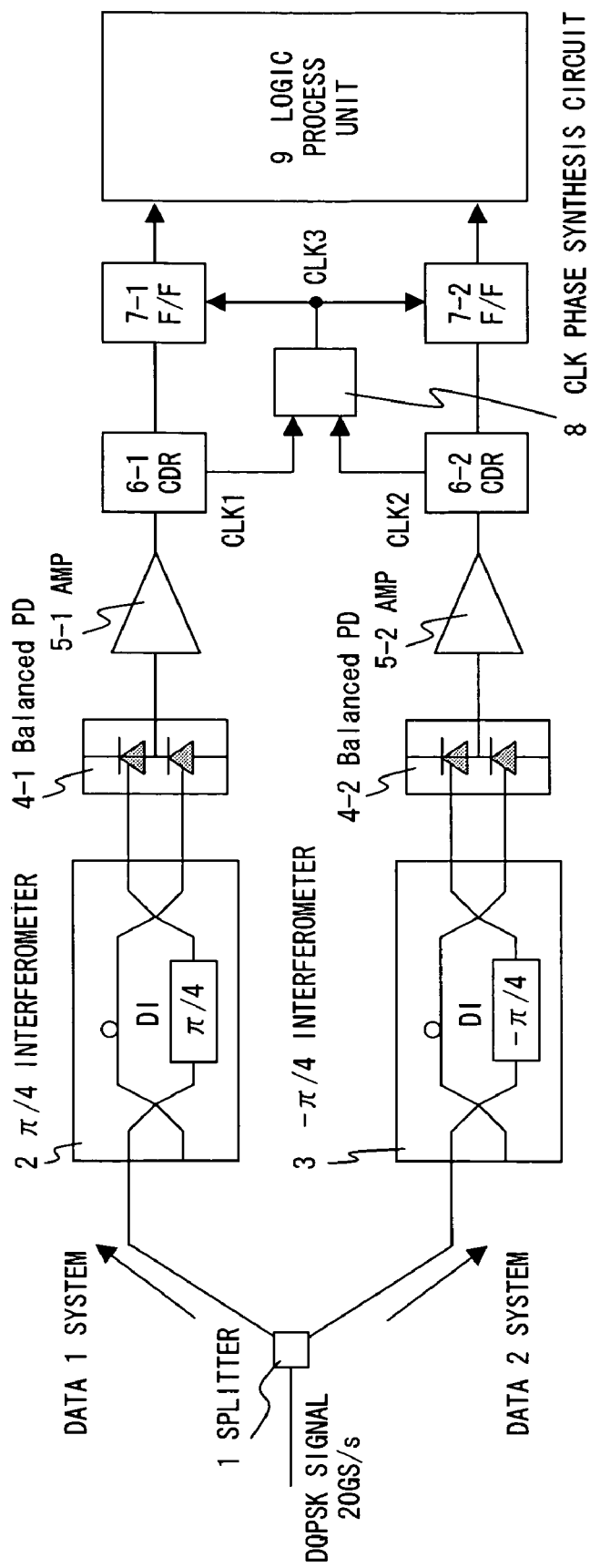
FIG. 2 shows a configuration of an embodiment of the present invention.

FIG. 2 shows a configuration of an embodiment of the present invention.

Figure 1:
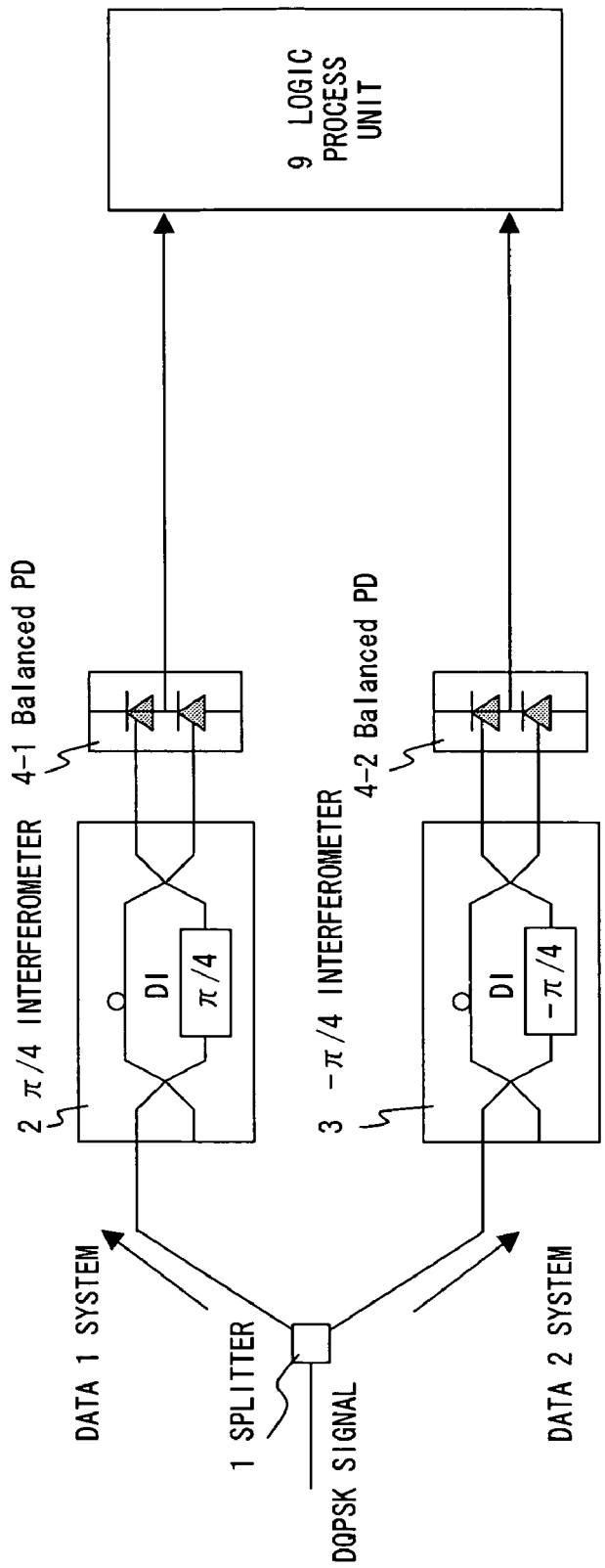
FIG. 1 shows a configuration of a conventional DQPSK optical receiver circuit.

In FIG. 2, components the same as those shown by FIG. 1 are assigned the same component reference numbers, and the descriptions thereof are omitted.

A splitter 1 splits an optical signal; a π/4 delay interferometer 2, −π/4 delay interferometer 3, balanced photodiodes 4-1 and 4-2 convert the split optical signals into electric signals; amplifiers 5-1 and 5-2 amplify the electric signals, respectively; and CDRs (Clock and Data Recovery) 6-1 and 6-2 are inserted individually into the Data 1 and Data 2 systems. Then, the VCO (Voltage Controlled oscillator) outputs of the two CDRs 6-1 and 6-2 are provided as clock signals CLK 1 and CLK 2, and input to a CLK phase synthesis circuit 8 for generating an intermediate phase thereof. The CLK phase synthesis circuit 8 then outputs an inverted signal (i.e., CLK 3; however, inversion is optional) of a clock signal having an intermediate phase of the clock signals CLK 1 and CLK 2 while having the same frequency as the aforementioned two signals. By using the inverted clock signal CLK 3, flip flops 7-1 and 7-2 latch the CDR outputs of the Data 1 and Data 2 systems. The outputs of the flip flops become synchronized data of the Data 1 and Data 2 systems.

The present embodiment of the present invention is configured to insert a CDR individually into the Data 1 and Data 2 systems, which makes it possible to identify each of the Data 1 and Data 2 systems with the optimum phase, respectively. By mere insertion of an individual CDR it is possible to identify the data, but errors may result in a logic process unit 9 because a phase difference at the input thereto cannot be avoided. The solution to this problem is for the CLK phase synthesis circuit 8 generate a inverted clock signal CLK 3, from the clock signals of the CDRs of the Data 1 and Data 2 systems which is used for data recovery, having an intermediate phase thereof. By the inverted clock signal CLK 3, the flip flop circuit latches the two CDR outputs. Since the phase of the inverted clock signal CLK 3 is an intermediate phase of the clock signals CLK 1 and CLK 2, the phase differences therewith is ¼ cycle or less of the data. If the phase tolerance of the flip flop circuit has no less than 180 degrees, there is no error caused by the inverted clock signal CLK 3 and therefore it is possible to eliminate a phase difference of data between the Data 1 and Data 2 systems.

According to the present embodiment of the present invention, even if there is a differential delay between signals of the Data 1 and Data 2 systems, a DQPSK optical receiver capable of maintaining receiving sensitivity can be obtained.

Figure 3:
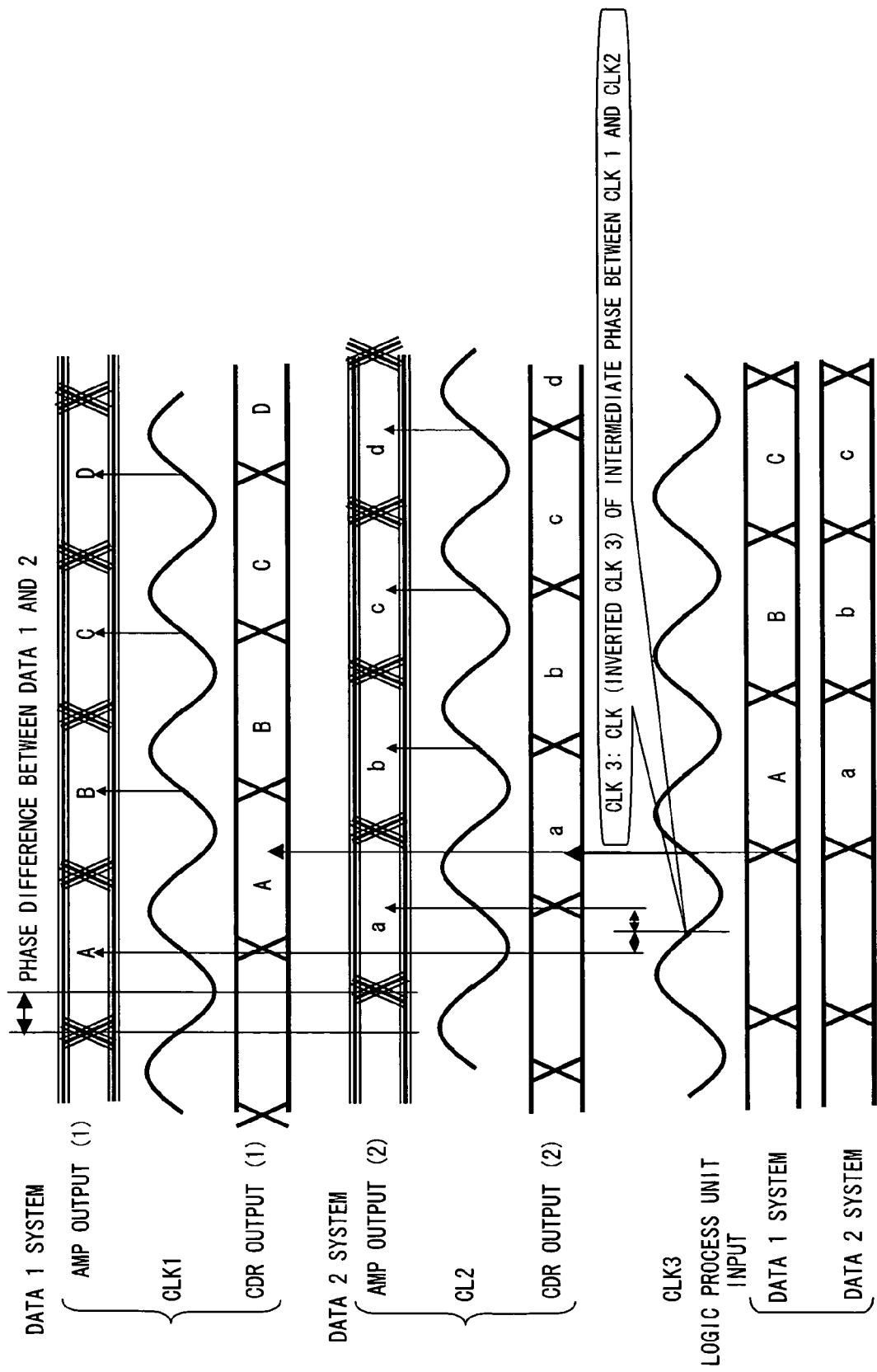
FIG. 3 is a timing chart describing operation of the embodiment according to the present invention.

FIG. 3 is a timing chart describing operation of the embodiment according to the present invention.

For the signal of Data 1 system, signals A, B, C and D are obtained in the Amp output (1) of the amplifier 5-1. Inputting these to the CDR 6-1 and recovering a clock signal and data obtains a clock signal such as CLK 1 shown by FIG. 3 and a CDR output (1). In the mean time, for the Data 2 system operating independently of the Data 1 system, signals a, b, c and d are obtained in the Amp output (2) of the amplifier 5-2. Inputting these to the CDR 6-2 obtains a clock signal such as CLK 2 shown by FIG. 3 and a CDR output (2). Comparing these signals of the Data 1 system with those of the Data 2 system determines a phase difference. Then, the CLK phase synthesis circuit 8 generates an inverted clock signal CLK 3 having an intermediate phase between clock signals CLK 1 and CLK 2, and latches the CDR outputs (1) and (2) by using the inverted clock signal CLK 3, thereby obtaining signals of the Data 1 and Data 2 systems with synchronized phases, such as the signals of the Data 1 and Data 2 systems as shown by the bottom part of FIG. 3.

Figure 4:
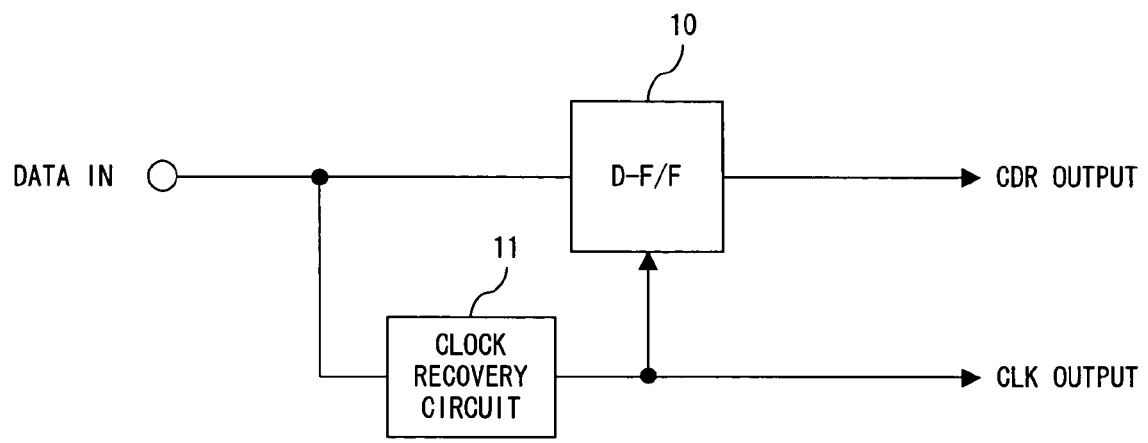
FIG. 4 is a block diagram showing a summary configuration of a CDR.

FIG. 4 is a block diagram showing a summary configuration of a CDR.

The CDR comprises a D-flip flop 10 and a clock recovery circuit 11. As data being input, the clock recovery circuit 11 reproduces a clock signal from the data. The reproduced clock signal is output as a CLK output. The input data is also input to the D-flip flop 10 and latched by the clock signal reproduced by the clock recovery circuit 11 to become a CDR output.

As for the CDR, a circuit using a Bang-Bang phase comparator noted by the description of the U.S. Pat. No. 5,012,494 is generally used.

FIG. 5 shows an example configuration of a CLK phase synthesis circuit.

A CLK phase synthesis circuit can adopt a phase interpolation circuit noted in the Japanese patent application publication No. 11-225050. The circuit noted by the patent document is configured to output an OR operation result of two inputs.

FIG. 6 shows a first modified example of an embodiment according to the present invention.

In FIG. 6, components the same as those of FIG. 2 are assigned the same component reference numbers and the descriptions thereof are omitted here.

The present modified example comprises a delay adjustment circuit 15 and delay devices 1 and 2. The delay devices 1 and 2 have the same delay amount and the adjustment is such that the delay amount of the clock signal CLK 3 relative to the clock signal CLK 1 is one half of the delay amount of the clock signal CLK 2 relative to the clock signal 1. A signal of the Data 2 system is latched by the D-flip flop 16 by a clock signal delayed by the amount which the delay devices 1 and 2 delay the clock signal obtained by the CDR 6 of the Data 1 system. Then, the signals of the Data 1 and Data 2 systems are latched by the flip flops 7-1 and 7-2 by using a clock signal CLK 3 which is delayed by one half of the delay amount of the clock signal CLK 2 relative to the clock signal CLK 1, becoming signals of the same phase. The timing for latching a signal of the Data 2 system by the D-flip flop 16 is a result of a delay provided by the delay adjustment circuit 15 controlling the clock signal CLK 1, and therefore the manufacturer of the delay adjustment circuit 15 needs to adjust the control amount thereof before the optical receiver circuit shown by FIG. 6 can be operated.

FIG. 7 shows a second modified example of the embodiment according to the present invention.

In FIG. 7, components the same as those of FIG. 2 are assigned the same component reference numbers and the descriptions thereof are omitted here.

Referring to FIG. 7, an optical signal input to a splitter 1 is an RZ-DQPSK signal, and low pass filters 17-1 and 17-2 are equipped at a stage following amplifiers 5-1 and 5-2. In the RZ-DQPSK signal, even if an optical phase carrying a data value does not change, the light intensity becomes zero (0) at a certain cycle. Therefore, amplifier output is passed through low pass filters 17-1 and 17-2 in order to extract the changing part of the optical phase, i.e., low frequency components and filter out that of the optical intensity, i.e., high frequency components. The cutoff frequency of the low pass filter is set between the changing frequency of the optical phase and that of the optical intensity.

Figure 8:
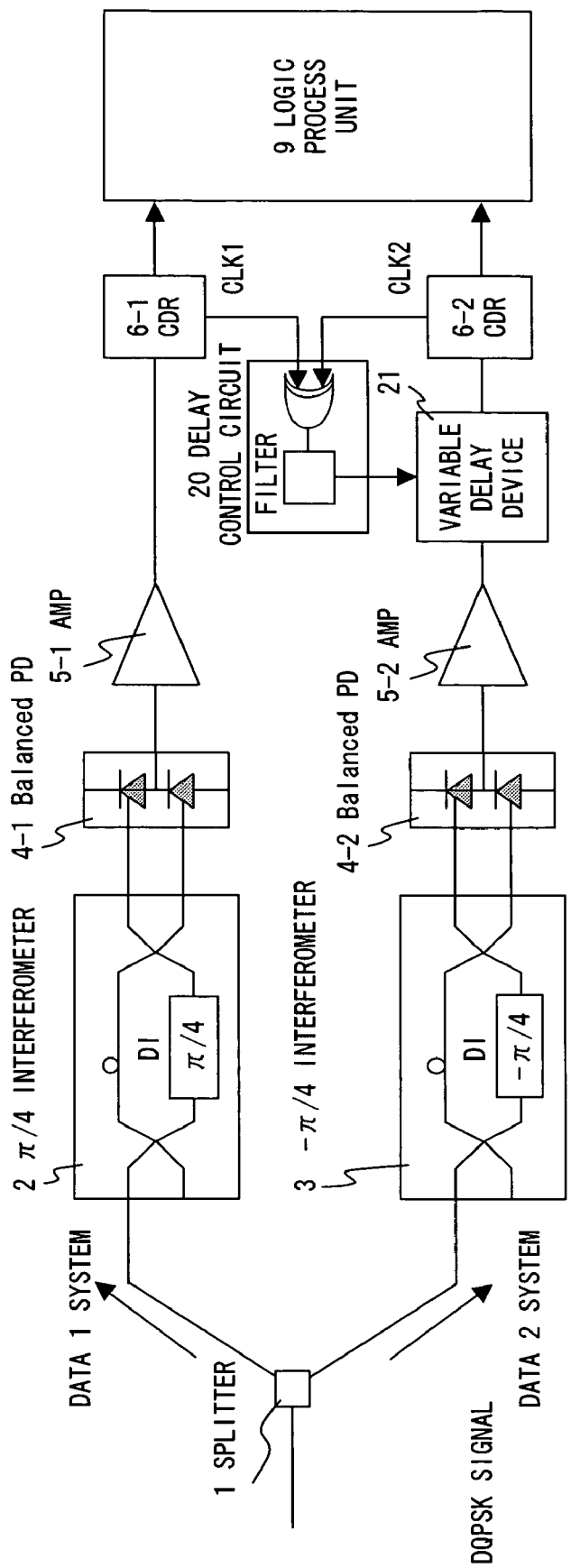
FIG. 8 shows a third modified example of an embodiment according to the present invention.

FIG. 8 shows a third modified example of the embodiment according to the present invention.

In FIG. 8, components the same as those of FIG. 2 are assigned the same component reference numbers and the descriptions thereof are omitted here.

Referring to FIG. 8, a delay control circuit 20 and a variable delay device 21 are equipped, in place of a CLK phase synthesis circuit 8. The delay control circuit 20 compares clock signals CLK 1 and CLK 2, and inputs the result to the variable delay device 21 which then adjusts the delay amount of a signal of the Data 2 system so as to eliminate the phase difference between the clock signals CLK1 and CLK2. This makes it possible to eliminate the phase difference of clock signals generated by CDRs 6-1 and 6-2, that is, the phase difference of both data.

Figure 9:
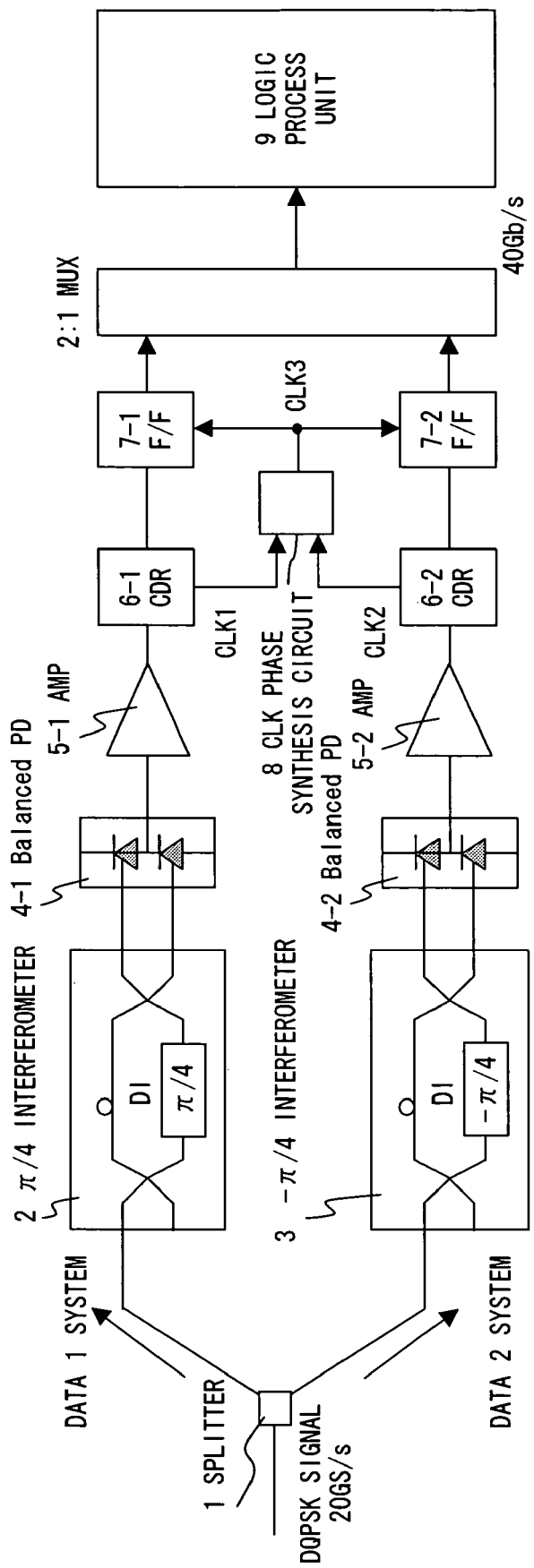
FIG. 9 shows a fourth modified example of an embodiment according to the present invention.

FIG. 9 shows a fourth modified example of the embodiment according to the present invention.

In FIG. 9, components the same as those of FIG. 2 are assigned the same component reference numbers and the descriptions thereof are omitted here.

Referring to FIG. 9, a 2:1 multiplexer 22 is equipped. The 2:1 multiplexer 22 multiplexes a signal of the Data 1 system which is output from a flip flop 7-1 with that of the Data 2 system which is output from a flip flop 7-2 according to an inverted clock signal CLK 3, and converts a parallel signal made up of two system signals of the Data 1 and Data 2 systems into a serial signal to input to a logic process unit 9. Converting to a serial signal relieves the logic process unit 9 of processing the two synchronized signals in parallel, thereby making it possible to simplify the circuit configuration and produce the logic process unit 9 at low cost.

The present embodiment according to the present invention is configured to connect respective CDRs to two balanced photodiode outputs, for DQPSK modulated optical signals and latch the CDR outputs by flip flops by using an intermediate phase of the two CDR clocks. Therefore, if there is a differential delay between signals of the Data 1 and Data 2 systems, a DQPSK optical receiver capable of securing a receiving sensitivity can be obtained.

What is claimed is:

1. A DQPSK optical receiver circuit for receiving an optical signal which is DQPSK modulated, comprising:
    a splitting unit for splitting a received optical signal;
    a first photoelectric conversion unit for converting one phase modulated component of one of the optical signals which is split by the splitting unit into an intensity modulated electric signal;
    a second photoelectric conversion unit for converting a phase modulated component which is orthogonal to the one phase modulated component of the other optical signal split by the splitting unit into an intensity modulated electric signal;
    a first data reproduction unit for reproducing a data signal and a clock signal from an output of the first photoelectric conversion unit;
    a second data reproduction unit for reproducing a data signal from an output of the second photoelectric conversion unit; and
    a phase synchronization unit for synchronizing phases of an output data signal of the first data reproduction unit and an output data signal of the second data reproduction unit.

2. The DQPSK optical receiver circuit according to claim 1, wherein
    said phase synchronization unit comprises
    a clock phase synthesis unit for generating a clock signal synchronized with a clock signal having an phase intermediate between the phase of the output data signal of said first data reproduction unit and the phase of the output data of said second data reproduction unit;
    a first flip flop unit for latching the output data signal of the first data reproduction unit by the clock signal; and
    a second flip flop unit for latching the output data signal of the second data reproduction unit by the clock signal.

3. The DQPSK optical receiver circuit according to claim 1, wherein
    said phase synchronization unit comprises a delay unit for delaying the phase of an output clock signal of said first data reproduction unit;
    said second data reproduction unit reproduces data by using the delayed output clock signal; and
    the phase synchronization unit further latches output data of the first data reproduction unit and that of the second data reproduction unit by using a semi-delayed clock signal having a delay amount a half of the delayed output clock signal.

4. The DQPSK optical receiver circuit according to claim 1, wherein
    an optical signal split by said splitting unit is an RZ-DQPSK signal; and
    a low pass filter for removing a signal component corresponding to an intensity modulated component of an optical signal is equipped at the front stages of said first data reproduction unit and second data reproduction unit.

5. The DQPSK optical receiver circuit according to claim 1, wherein
    said phase synchronization unit synchronizes phases of the below mentioned two output signals by delaying either an output data signal of said first data reproduction unit or that of said second data reproduction unit.

6. The DQPSK optical receiver circuit according to claim 1, further comprising
    a multiplexer unit for multiplexing output data signals, whose phases are synchronized, of said first data reproduction unit and said second data reproduction unit.

7. The DQPSK optical receiver circuit according to claim 1, wherein
    said DQPSK modulation optical signal is modulated so that a relative phase relating to a signal one symbol prior assumes one value of $\pi/4$, $3\pi/4$, $-\pi/4$ or $-3\pi/4$.

8. The DQPSK optical receiver circuit according to claim 1, wherein
    said first photoelectric conversion unit comprises a $\pi/4$ delay interferometer and a balanced photodiode, and converts components of an optical signal whose relative phases are $\pi/4$ and $-3\pi/4$ into an intensity modulated electric signal.

9. The DQPSK optical receiver circuit according to claim 1, wherein
    said second photoelectric conversion unit comprises a $-\pi/4$ delay interferometer and a balanced photodiode, and converts components of an optical signal whose relative phases are $-\pi/4$ and $3\pi/4$ into an intensity modulated electric signal.

10. The DQPSK optical receiver circuit according to claim 1, further comprising
    an amplifier unit for amplifying an output data signal of said first photoelectric conversion unit and that of said second photoelectric conversion unit, respectively.

* * * * *